US010562424B2

(12) United States Patent
Stuiber et al.

(10) Patent No.: US 10,562,424 B2
(45) Date of Patent: Feb. 18, 2020

(54) ARMREST

(71) Applicant: GRAMMER AG, Amberg (DE)

(72) Inventors: Martin Stuiber, Stulln (DE); Aly Kone, Nuremberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/599,790

(22) Filed: May 19, 2017

(65) Prior Publication Data

US 2017/0334323 A1 Nov. 23, 2017

(30) Foreign Application Priority Data

May 20, 2016 (DE) .................. 10 2016 006 087

(51) Int. Cl.
*B60N 2/75* (2018.01)
*G05G 1/62* (2008.04)

(52) U.S. Cl.
CPC ............. *B60N 2/793* (2018.02); *B60N 2/753* (2018.02); *B60N 2/767* (2018.02); *G05G 1/62* (2013.01); *B60N 2/75* (2018.02)

(58) Field of Classification Search
CPC .... B06N 2/4633; B06N 2/4686; B06N 2/933; B06N 2/75; B06N 2/753; B06N 2/793; Y10T 16/540247; Y10T 16/5409; Y10T 16/54025; Y10S 292/15; Y10S 292/61; Y10S 292/80; Y10S 292/81; Y10S 292/97; G05G 1/62; A47C 7/543
USPC ...................... 297/411.21, 411.32; 296/24.34
See application file for complete search history.

(56) References Cited

U.S. PATENT DOCUMENTS

| 2,026,016 A | * | 12/1935 | Blood | B60N 3/02 292/164 |
| 4,310,196 A | * | 1/1982 | Vogel | B60N 2/242 297/411.32 |
| 4,790,579 A | * | 12/1988 | Maxwell | E05C 1/10 292/175 |
| 5,116,099 A | * | 5/1992 | Kwasnik | A47C 7/543 297/188.15 |
| 5,639,002 A | * | 6/1997 | Weitbrecht | B60R 7/04 224/539 |
| 6,033,015 A | * | 3/2000 | Husted | B60N 2/793 297/188.19 |

(Continued)

FOREIGN PATENT DOCUMENTS

| EP | 2085267 A1 * | 8/2009 | ............... B60R 7/04 |
| EP | 3246199 A1 * | 11/2017 | ........... B60N 2/4633 |
| JP | 2013147223 A * | 8/2013 | |

OTHER PUBLICATIONS

Machine translation of EP 2085267, 5 pages, translated May 24, 2018.*

(Continued)

*Primary Examiner* — Robert Canfield
(74) *Attorney, Agent, or Firm* — Andrew Wilford

(57) ABSTRACT

An armrest has a base, a support arm pivotal on the base between a first end position and a second end position, and a latch including a first latch formation on the support arm and a second latch formation on the base for securing the support arm relative to the base in at least one of the end positions. A spring biases the support arm into the first end position and carries one of the first and second latch formations.

8 Claims, 7 Drawing Sheets

(56) References Cited

U.S. PATENT DOCUMENTS

| | | | | |
|---|---|---|---|---|
| 7,100,242 B2* | 9/2006 | Maierholzner | ........ | B60N 2/933 16/319 |
| 7,878,567 B2* | 2/2011 | Schneider | ................. | B60R 7/04 296/24.34 |
| 8,534,761 B2* | 9/2013 | Saxton | ................... | B64D 11/06 297/411.32 |
| 2005/0132768 A1* | 6/2005 | Furuya | ..................... | E05C 3/16 70/422 |
| 2007/0108785 A1* | 5/2007 | Reischer | ............... | B60N 2/793 296/24.34 |
| 2007/0290518 A1* | 12/2007 | Tiesler | ..................... | B60R 7/08 296/24.34 |
| 2013/0097809 A1* | 4/2013 | Weber | ....................... | E05D 5/00 16/308 |
| 2016/0090014 A1* | 3/2016 | Dinant | .................. | B60N 2/464 297/411.36 |

OTHER PUBLICATIONS

Machine translation of JP 2013-147223, 12 pages, tranalted May 24, 2018.*

* cited by examiner

ARMREST

FIELD OF THE INVENTION

The present invention relates to an armrest. More particularly this invention concerns an adjustable armrest for a motor vehicle.

BACKGROUND OF THE INVENTION

An armrest can be part of a console of an automobile, for example. The armrest has a base that can be formed from parts of the seat or by a solid structure, particularly a vehicle frame. A support arm is carried on the base and can be moved between a first end position and a second end position. The support arm can be locked in at least one of the end positions and then cannot be moved inadvertently out of this end position.

OBJECTS OF THE INVENTION

It is therefore an object of the present invention to provide an improved armrest.

Another object is the provision of such an improved armrest that overcomes the above-given disadvantages, in particular that is simple to manufacture and easy to handle for the user.

SUMMARY OF THE INVENTION

An armrest has according to the invention a base, a support arm pivotal on the base between a first end position and a second end position, and a latch including a first latch formation on the support arm and a second latch formation on the base for securing the support arm relative to the base in at least one of the end positions. A spring biases the support arm into the first end position and carries one of the first and second latch formations.

The one latch formation can be formed by a specific shape of the spring, for example. The locking occurs in the upper end position of the support arm, for example.

The upper end position refers to the position of the support arm in which the support arm is approximately vertical.

The spring can be of one piece and formed as a leaf spring, for example.

According to one embodiment, the spring has a first and a second spring leg. This offers the advantage that the legs can have different functions, for example, such as a support, attachment, or latching. At least one of the spring legs is freely movable, for example. Due to the return force of the spring, the spring leg moves back into its initial position after elastic deformation.

The spring has an bight portion that coacts with retaining means of the support arm or of the base. The bight portion is fixed to the support arm or to the base, for example. The bight portion coacts with the retaining means in order to attach the spring to the support arm or to the base. At least one of the spring legs can be moved relative to the bight portion. The spring legs extending at an angle to the bight portion, for example. These portions can be pivoted relative to the bight portion.

A support portion of the spring biases the support arm toward an end position at least in one pivot portion of the support arm. That is, the support portion can bias the support arm over the entire pivot range toward the end position or only in a portion of the pivot angle. This portion can be between 15° and 50°, for example, particularly about 25°. For example, the spring is tensioned when the support arm moves into the lower end position and has maximum tension when in the lower end position. When the support arm is moved toward the upper end position, the spring is relaxed. If the spring biases the support arm into the upper end position in only a portion of the pivot range, the support portion can be in contact with the base or support arm only in this portion, for example.

For example, the latch formation is on the first spring leg and requires a small spring deflection in order to be moved from the locked position into the released position.

The support portion is on the second spring leg and the second spring leg can be displaced over a relatively long spring deflection, for example. The spring can then bias the support arm over a large pivot angle into the upper end position.

The first latch formation can engage in a form-fitting manner with the second latch formation, for example. This means, for example, that an interlocking formation of the spring can engage detachably with a formation of the base or of the support arm. The spring is attached to the support arm or to the base. The coacting and interfitting formations can be embodied such that, when more than a defined actuating force is applied to support arm, the positive engagement is automatically released. In other words, as long as the actuating force on the support arm is not reached, the positive engagement remains and the support arm is locked in position.

The first latch formation has a latching shoulder, for example, and the second latch formation has a bearing surface for preventing the support arm from moving. Through an easy movement of the first latch formation, the latching shoulder and the bearing surface can be disengaged. The positive engagement can thus be released.

The armrest has a latch, for example, by means of which the support arm can be locked in an end position. For example, when the spring is maximally tensioned in the lower end position, the spring biases the support arm toward the upper end position as soon as the latch has been moved from the locked position into the unlocked position.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
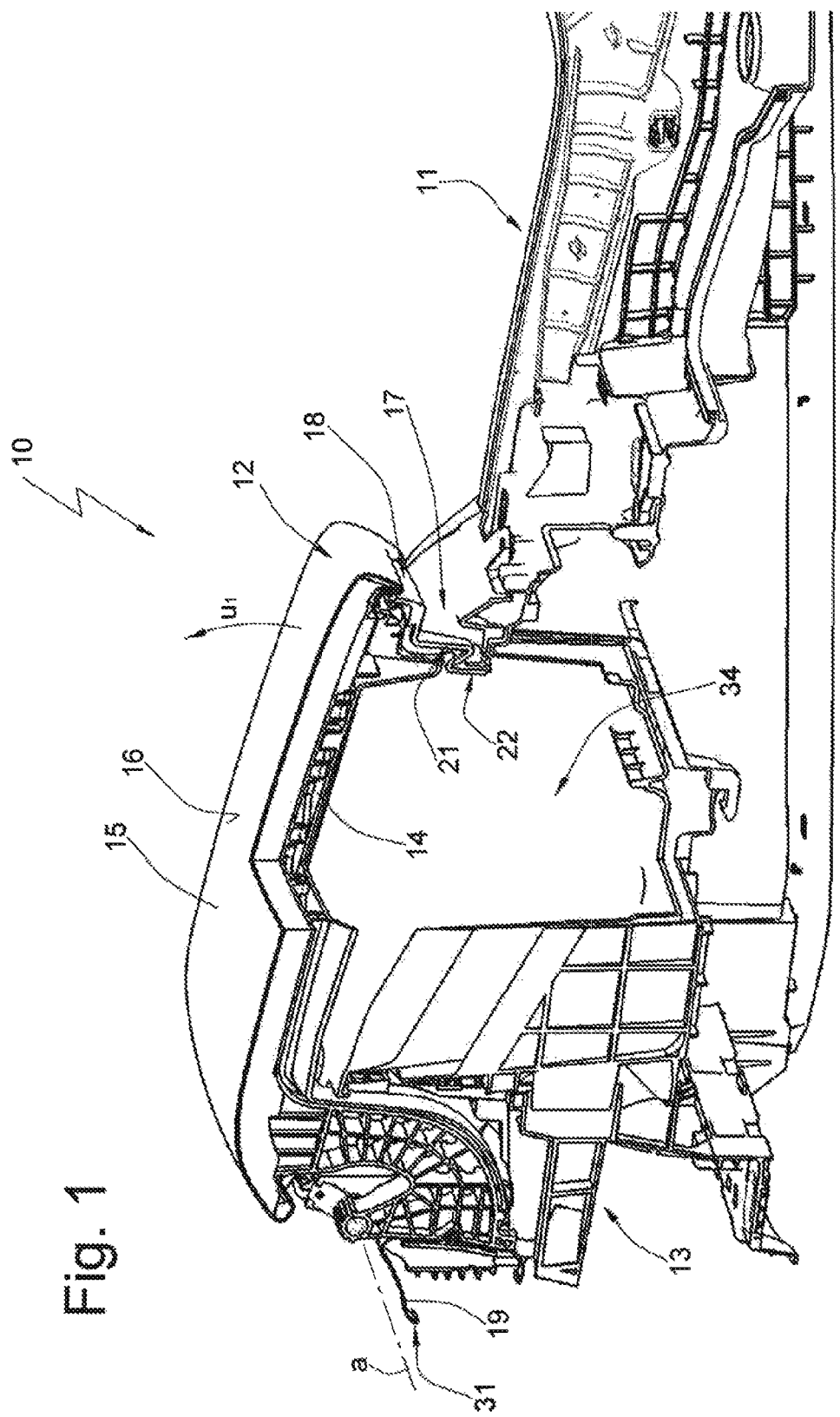
FIG. 1 is a partly sectional perspective view of an armrest with the support arm in the lower end position.

In the drawing, an armrest is shown generally at 10. The same reference symbols in the various figures designate analogous parts, even if lowercase letters are added or omitted.

In this embodiment, the armrest 10 is part of a center console 11. It could also be part of an automobile seat as a separate armrest. The armrest 10 has an arm support 12 that is held on a base 13 such that it can pivot about an axis a. The arm support 12 has a support arm 14 and a cushion 15. In FIG. 1, the arm support 12 is in a lower end position that is also referred to as the 0° position. In the lower end position, an upper support surface 16 is be substantially horizontal or only slightly inclined to the horizontal. The arm support 12 can be pivoted from the lower end position in an opening direction $u_1$ into an upper end position shown in FIG. 3. In the upper end position, the arm support 12 is pivoted about 90° in the direction $u_1$ relative to the lower end position.

The armrest 10 has a first latch 17 with which the support arm 14 can be releasably locked in the lower end position. In the locked position of the first latch 17, the support arm 14 is locked in the lower end position. Pressing an actuator button 18 moves the first latch 17 into a released position. In the released position, the support arm 14 is no longer locked, and the arm support 12 can pivot up out of the locked lower end position in direction $u_1$.

Figure 2:
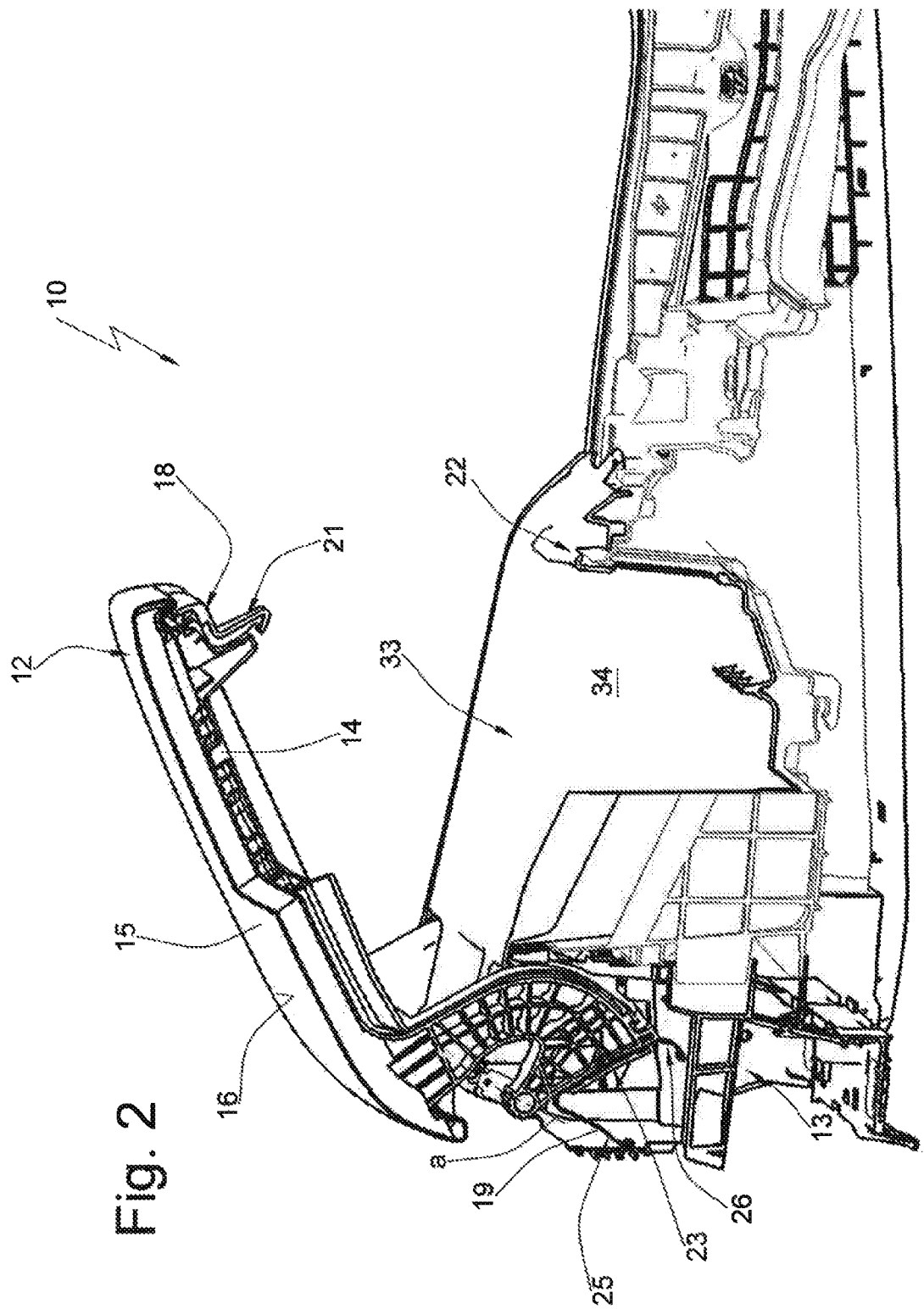
FIG. 2 is a view like FIG. 1 but with the arm support in an intermediate position.

The arm support 12 is biased by a spring 19 in the opening direction $u_1$ such that, after the first latch 17 is moved into the released position, it is moved by the spring 19 into an intermediate position shown in FIG. 2 in which it is pivoted about 25° in the direction $u_1$ relative to the lower end position. The arm support 12 is thus in the intermediate position between the lower end position and the upper end position. If the arm support 12 is to be moved out of the intermediate position into the upper end position, the user must pivot the arm support 12 manually in the direction $u_1$ until the upper end position has been reached. In the upper end position, the arm support 12 is approximately vertical, for example.

A second latch 20 automatically but releasably secures the arm support in the upper end position. As soon as a force F acts in direction $u_2$ on the arm support 12 that is great enough that the maximum holding force of the latch 20 is overcome, the arm support 12 pivots in a closing direction $u_2$ opposite the opening direction $u_1$. In the lower end position, the arm support 12 is again locked automatically by the first latch 17.

Figure 3:
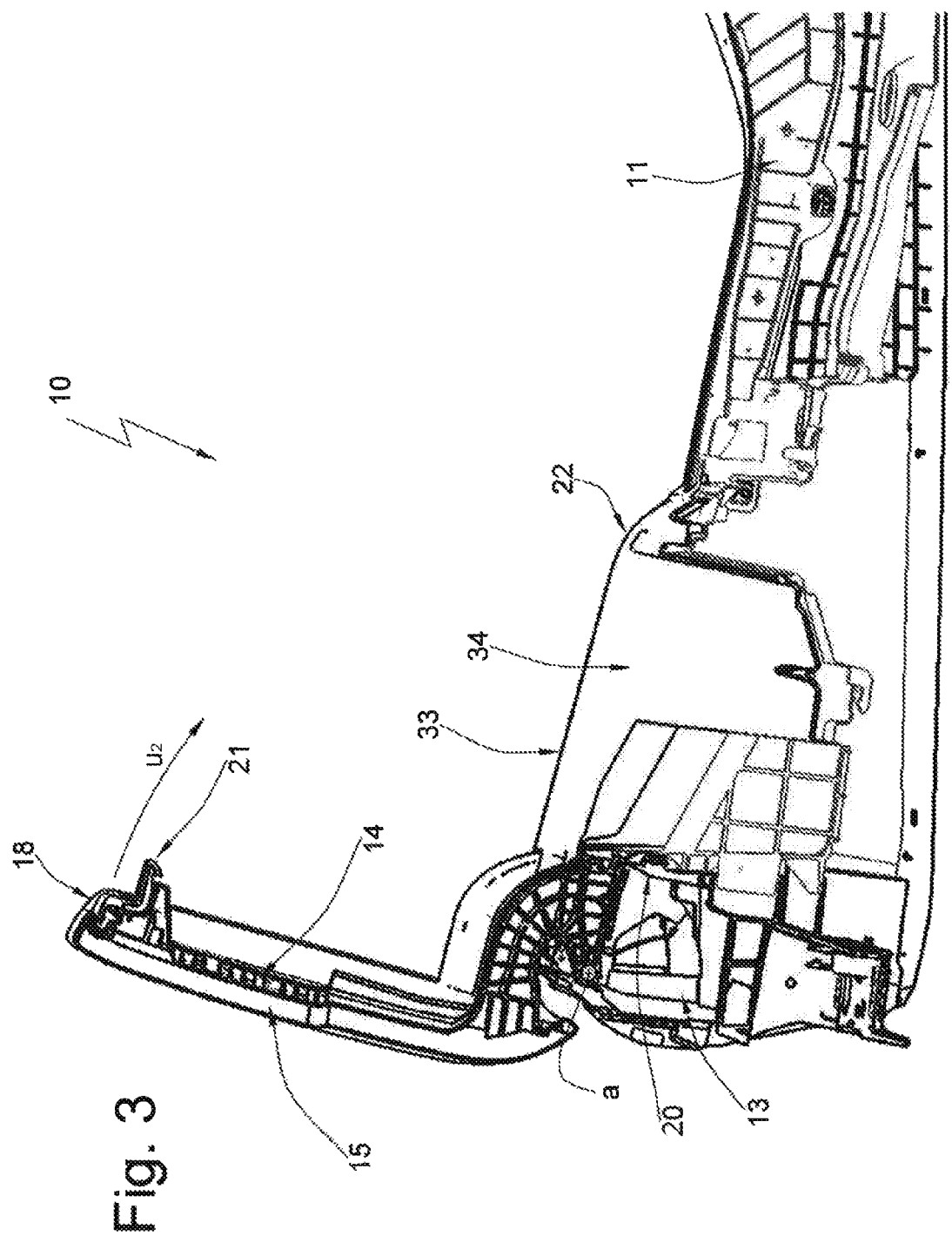
FIG. 3 is another view like FIG. 1 but with the arm support in the upper end position.

It can be seen in FIGS. 1 to 3 that the first latch 17 has a first latch formation 21 held on the support arm 14 and a second latch formation 22 held on the base 13, the formations 21 and 22 being formed as oppositely vertically directed and interengaging hooks. In the locked position, the latch formation 21 and 22 are hooked together to prevent the arm support 12 from moving, and in the released position, the latch formation 21 and 22 are disengaged. The latch formation 21 can be moved such that it can be displaced by the button 18 between the locked position and the released position. The latch formation 21 is biased into the locked position.

The armrest 10 has the spring 19 (see FIGS. 4 and 5) that is a one-piece leaf spring in this embodiment. The spring 19 has a bight or bight portion 23 with a projection 35 as well as a free spring leg 25 that forms a support portion and a free spring leg 26 that forms a latch formation.

Figure 4:
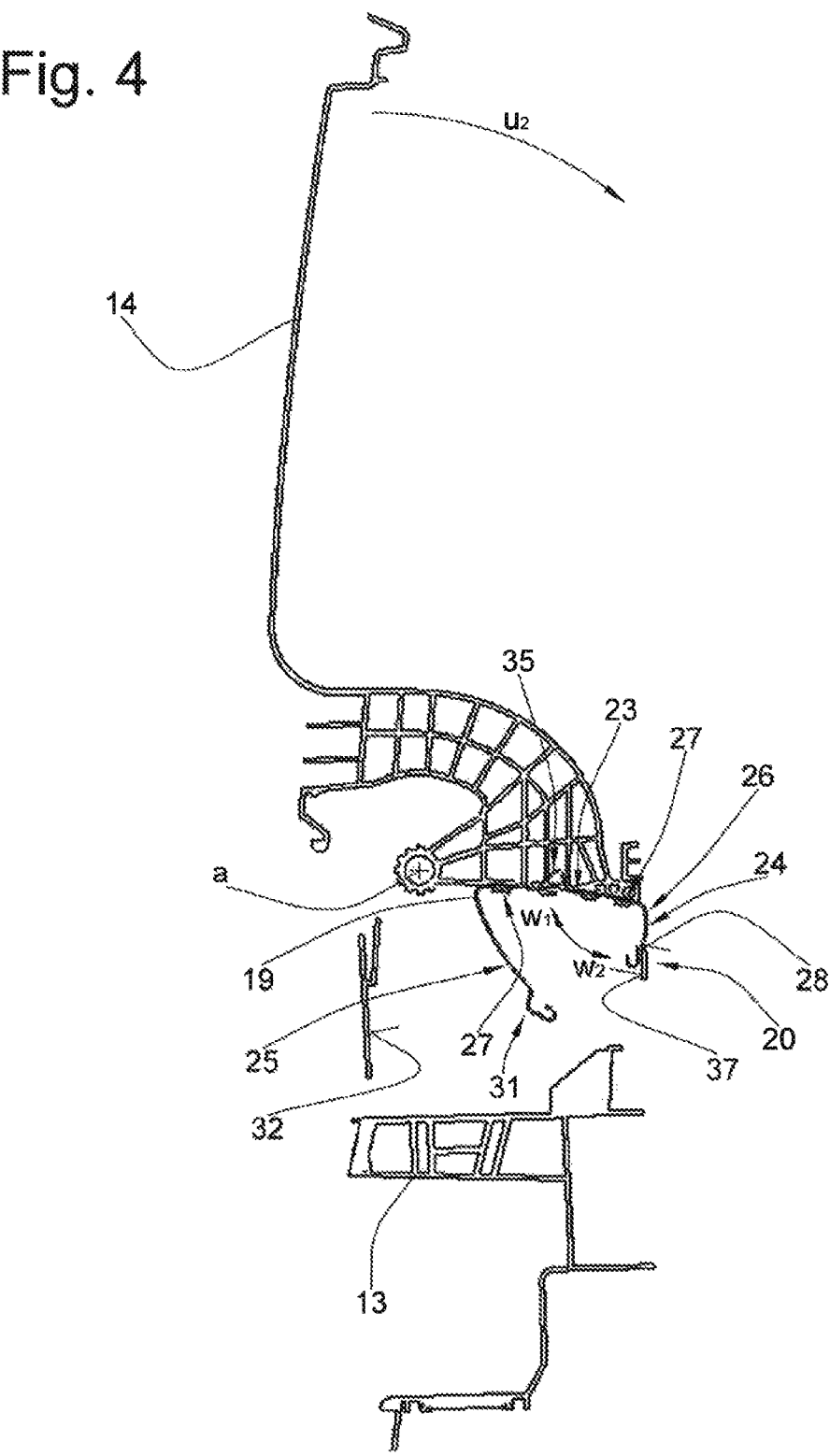
FIG. 4 is a longitudinal section through the armrest in the upper position of FIG. 3.
Figure 5:
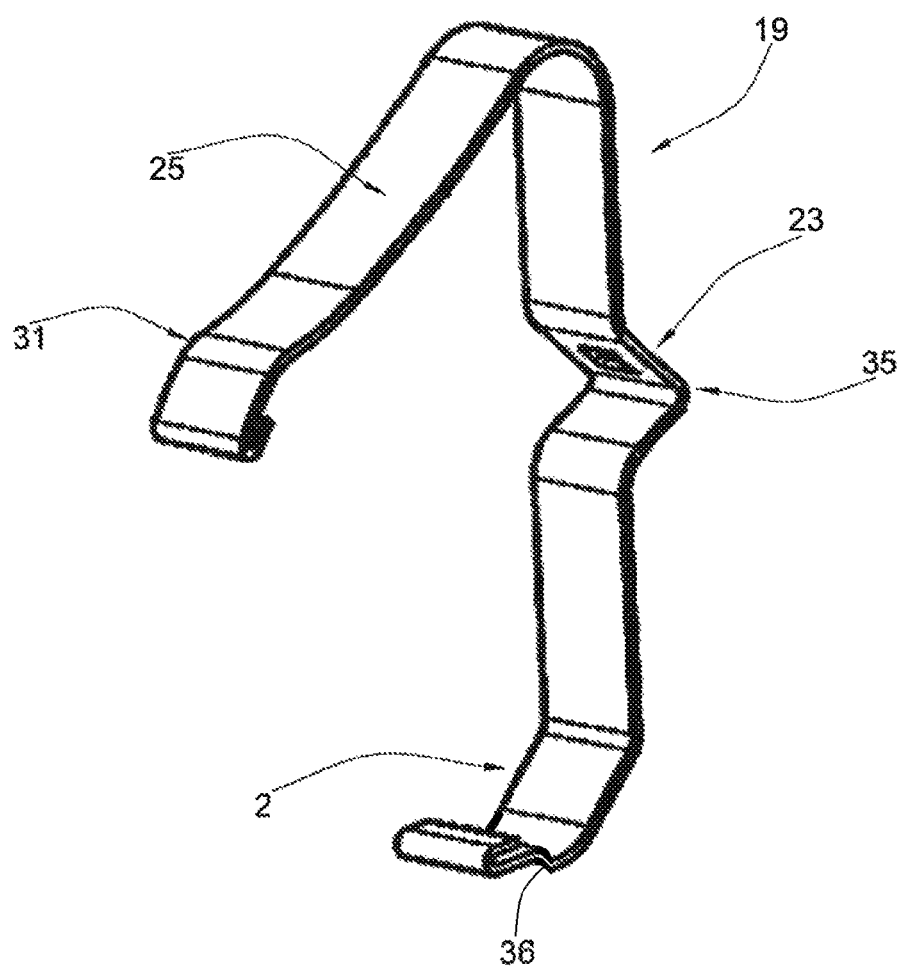
FIG. 5 is a large-scale detail of a spring of the armrest.
Figure 6:
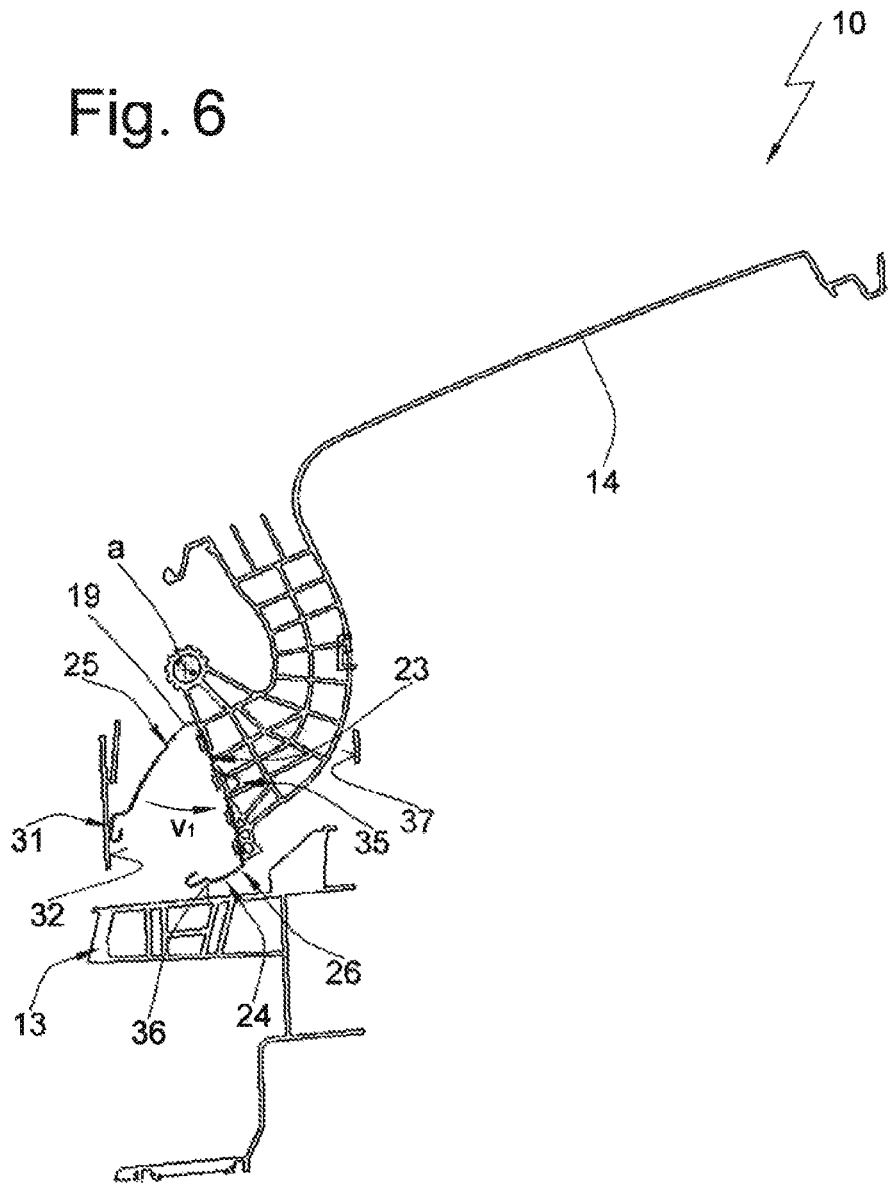
FIG. 6 is a longitudinal section through the armrest in the intermediate position of FIG. 2.

In FIG. 4, the support arm 14 is shown without the cushion 15 in the upper end position for the sake of clarity. The support arm 14 has attachment means 27 with which the bight portion 23 of the spring 19 is fixed to the support arm 14. The projection 35 coacts with the base 13 in order to prevent displacement of the bight portion 23 parallel to its longitudinal axis. The attachment means 27 is set up such that the bight portion 23 extends approximately radially to the axis a. In contrast, the spring leg 26 extends approximately tangentially to the axis a. While the bight portion 23 is substantially immovable relative to the base, the spring legs 25 and 26 can be moved freely and can be deformed elastically against their return force.

The spring leg 26 has a projection 24 that forms an offset or shoulder constituting a latch formation 36 that in the upper end position is engaged with a latch formation 28 of the base 13 such that the support arm 14 is prevented from moving out of the upper end position in the closing direction $u_2$ as long as the actuating force does not exceed a maximum holding force. As soon as a force acting on the support arm 14 in the closing direction $u_2$ exceeds the maximum holding force, forces acting transverse to the direction of movement $u_2$ elastically deflect the spring leg/latch formation 26 such that the shoulder 36 is disengaged from the latch formation 28. The support arm 14 can then be pivoted freely in the closing direction $u_2$. The spring leg 26 is then moved by its return force in a direction $w_2$. The maximum holding force is such that, for example, the inertial forces acting on the arm support 12 in normal driving situations do not move the latch 20 out of the locked position but that the vehicle occupant can move the support arm 14 out of the upper end position in the closing direction $u_2$ without unreasonable effort.

When the support arm 14 has been pivoted out of the upper end position so far in the closing direction $u_2$ that it is approximately in a 30° position, a support portion 31 of the spring leg 25 comes into contact with an abutment face 32 of the base 13. As the support arm 14 is pivoted further in direction $u_2$, the spring leg 25 is moved relative to the bight portion 23 and the spring leg 25 in direction $v_1$ and is thereby tensioned. In a 25° position, an equilibrium of forces exists between the spring force acting in direction $u_1$ and the weight acting in direction $u_2$.

Figure 7:
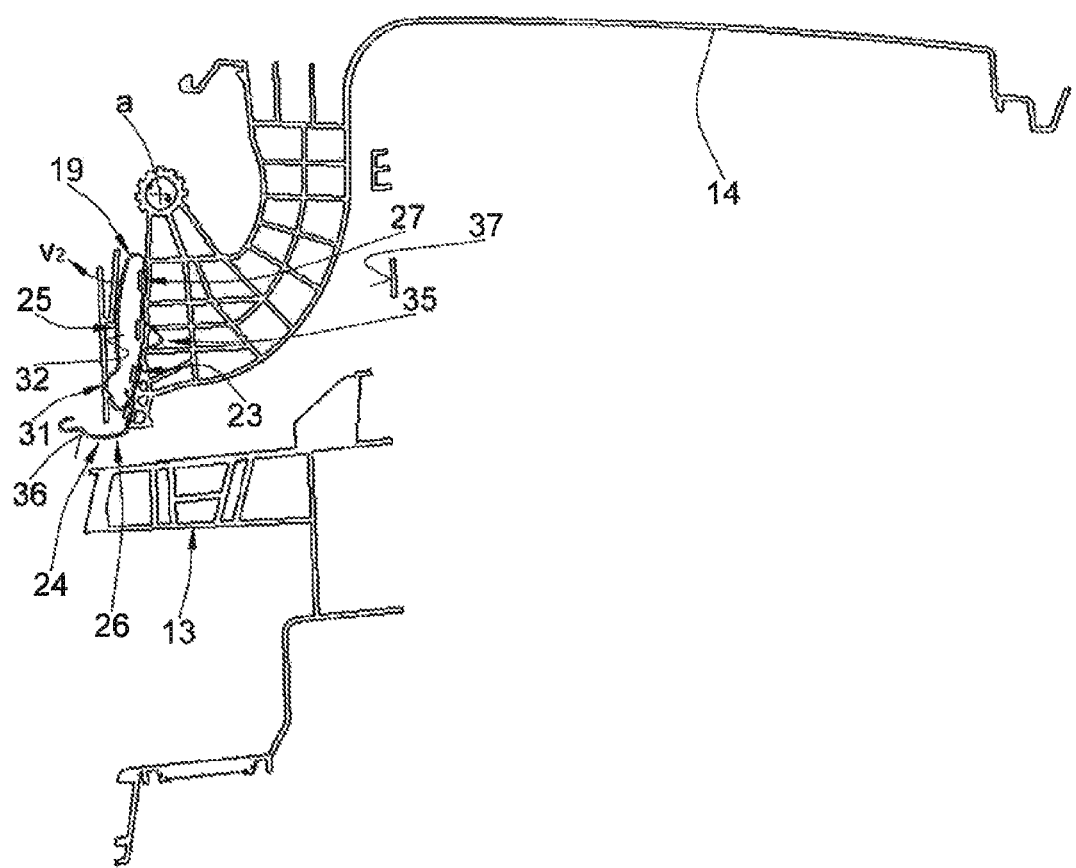
FIG. 7 is a longitudinal section through the armrest in the lower end position of FIG. 1.

FIG. 7 shows the lower end position in which the spring 19 is maximally tensioned. It can be seen that the spring leg 25 is approximately parallel to the bight portion 23. Moreover, in the lower end position, the first latch formation 21 and the second latch formation 22 are moved in engagement of FIG. 1. Thus the first latch 17 is in the locked position. The latch formations 21 and 22 are not shown in FIG. 8.

If the first latch 17 is moved into the released position, the spring 19 moves the support arm 14 again in the opening direction $u_1$ into a 25° position. The spring leg 25 pivots in a direction $v_2$ and relaxes. As mentioned above, the support arm 14 can be moved manually out of the 25° position in the opening direction $u_1$ into the upper end position. Right before reaching the upper end position, the spring leg 26 comes into contact with a surface 37 of the base 13, and the spring leg 26 is elastically deflected in a direction $w_1$ as the support arm 14 moves further in the opening direction $u_1$. Upon reaching the upper end position, the shoulder 26 of the spring leg 25 engages over the latch formation 28 of the base 13. In the upper end position, it is possible to access an oddments compartment 34 through an opening 33. In this embodiment, the oddments compartment 34 is part of the base 13 and embodied as a single piece therewith.

We claim:

1. An armrest comprising
   a base;
   a support arm pivotal on the base between a first end position and a second end position;
   a latch including a first latch formation carried by the support arm and a second latch formation on the base for releasably securing the support arm relative to the base in the second end position; and a spring on the support arm, biasing the support arm from one of the end positions toward the other end position, and forming the first latch formation.

2. The armrest defined in claim 1, wherein the spring is a one-piece leaf spring formed unitarily with the first latch formation.

3. The armrest defined in claim 2, wherein the leaf spring has first and second legs.

4. The armrest defined in claim 3, wherein the leaf spring has a bight portion from ends of which the first and second legs extend, the bight portion being fixed directly to the support arm.

5. The armrest defined in claim 4, wherein one of the first and second legs of the spring has a support portion engageable with the base in at least a portion of a pivot range between the first and second end positions.

6. The armrest defined in claim 1, wherein in the other end position the first latch formation fits with the second latch formation.

7. The armrest defined in claim 6 wherein the first latch formation is a shoulder formed on the spring and inhibiting movement of the support arm toward the other of the end positions, but deflectable out of engagement with the second latch formation when a force in a direction urging the support arm into the one end position is applied to the support arm.

8. The armrest defined in claim 1, further comprising:
another latch operable to secure the arm rest in the first position, the second position being an upper position.

* * * * *